United States Patent [19]
Wilson

[11] Patent Number: 5,420,774
[45] Date of Patent: May 30, 1995

[54] REPLACEABLE WARNING LIGHT LENS PROTECTOR

[75] Inventor: Andrew V. Wilson, Floral City, Fla.

[73] Assignee: Novation Research, Inc., Homosassa, Fla.

[21] Appl. No.: 101,395

[22] Filed: Aug. 2, 1993

[51] Int. Cl.6 .............................................. F21V 15/00
[52] U.S. Cl. ...................................... 362/376; 362/74; 362/217; 362/223; 362/255; 362/311; 362/335
[58] Field of Search ............... 362/255, 376, 223, 361, 362/335, 217, 222, 311, 61, 74

[56] References Cited

U.S. PATENT DOCUMENTS

| | | | |
|---|---|---|---|
| D. 316,460 | 4/1991 | Neece | D26/139 |
| 1,910,779 | 5/1933 | Stockman | 362/376 |
| 3,290,497 | 12/1966 | Ragle et al. | 362/376 |
| 4,088,881 | 5/1978 | Neer et al. | 362/223 |
| 4,189,709 | 2/1980 | Gosswiller | |
| 4,222,092 | 9/1980 | Bray | 362/80 |
| 4,334,211 | 6/1982 | McConnell et al. | |
| 4,439,817 | 3/1984 | Aton | 362/255 |
| 4,574,336 | 3/1986 | Mikalonis | 362/223 |
| 4,893,226 | 1/1990 | Neece | 362/376 |
| 4,894,761 | 1/1990 | Gray | 362/376 |
| 4,924,368 | 5/1990 | Northrop et al. | |
| 4,945,461 | 7/1990 | Crater | |
| 5,040,103 | 8/1991 | Lyons | 362/268 |
| 5,072,979 | 12/1991 | Swinton | 293/128 |
| 5,113,323 | 5/1992 | Allman et al. | 362/80 |

Primary Examiner—Ira S. Lazarus
Assistant Examiner—Sara Sachie Raab

[57] ABSTRACT

A device for protecting leading surfaces of a lens of an emergency vehicle warning light. The device has a replaceable, transparent shield adapted to be conformed to the profile of the leading surface. The shield is attached to the lens by upper and lower grooves formed in the lens. Notches are provided to assist with removal of the shield for replacement. Channels are provided to drain moisture from the lower groove. A first lens modified protector provides tracks, secured to the lens, for securing and conforming the shield to the lens. A second modified protector provides a thin, removable film for attachment to the lens by a pressure sensitive adhesive. A third modified protector provides a heating element attached to the shield for thawing, and for operably defrosting and preventing accumulation of frozen water products from and on the shield.

8 Claims, 2 Drawing Sheets

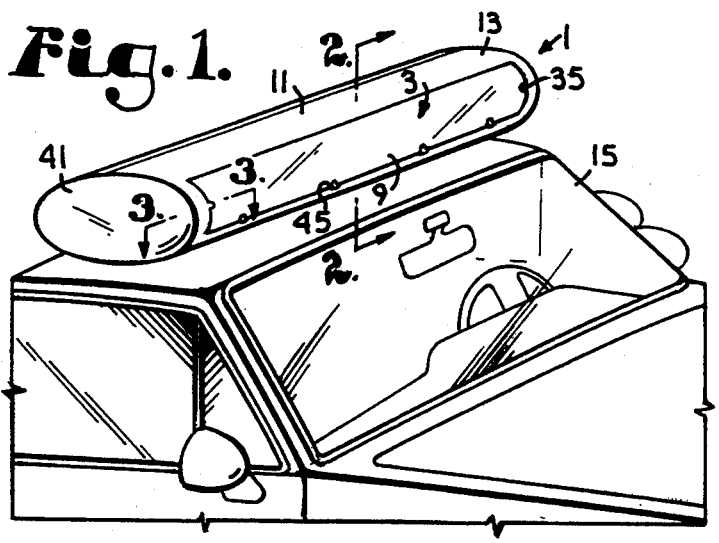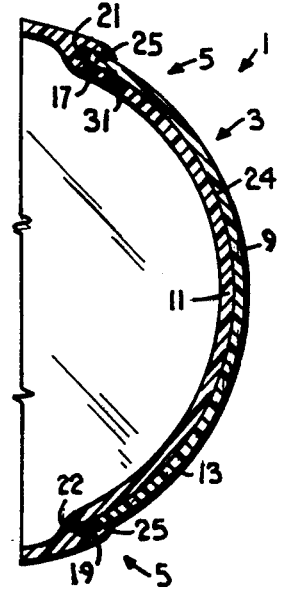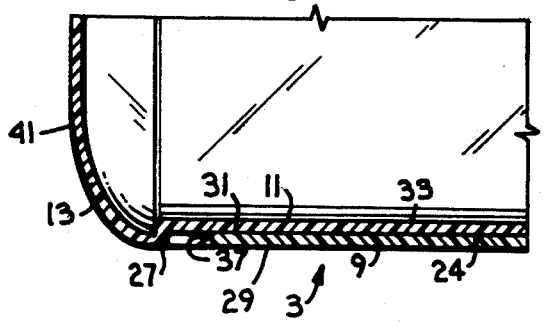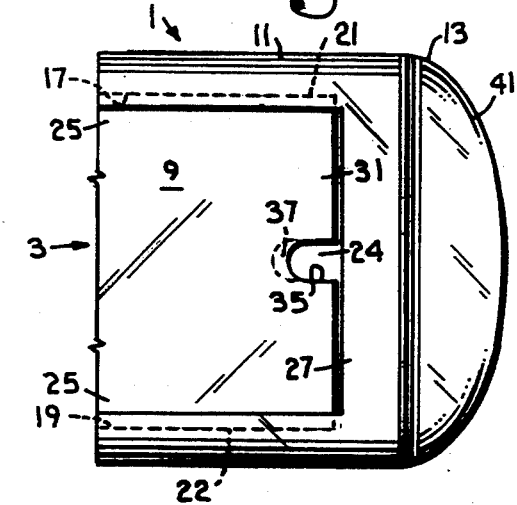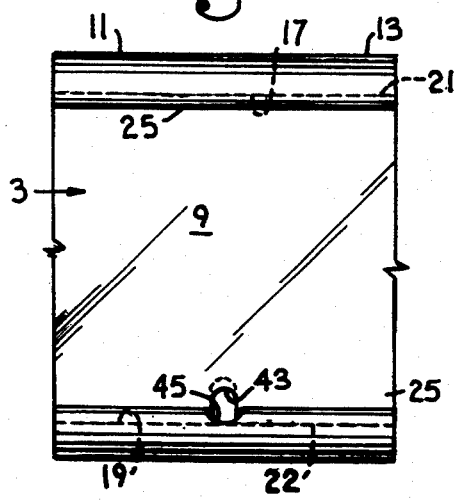

REPLACEABLE WARNING LIGHT LENS PROTECTOR

BACKGROUND OF THE INVENTION

1. Field of the Invention

The present invention relates generally to a replaceable protector shield for a vehicle lights lens and, in particular, without limitation, to a replaceable shield for a lens of an emergency vehicle warning light system.

2. Description of Related Art

Emergency vehicles, such as police cars, fire engines, ambulances, highway maintenance vehicles, wreckers, and the like, generally have emergency warning light systems affixed exteriorally thereto, such as on the roof thereof. Many of such systems have warning lights configured in the form of an elongated light bar with a transparent lens.

The lens is generally constructed of polycarbonate plastics, such as that provided by General Electric Company under the trademark Lexan, or the like. Although the lens is designed, among other things, to protect the internal elements of the light bar, it is subjected to considerable abuse from impacting bugs and gravel while traveling a high Speeds, hail, freezing rain, debris-laden high winds, and the like. Although certain polycarbonate plastic materials are functional and cost effective for such lens, such materials have limited durability, particularly in the hostile environment to which many of the light bars are subjected. As a result, the lens become faded, marred, scuffed and damaged even under normal operating conditions, such that its transparency and aesthetic appeal is substantially reduced with the end result being that the lens must be periodically replaced. Such replacement obviously adds considerable overhead expense.

What is needed is an inexpensive device which is removably attachable to an emergency vehicle warning light system to absorb the abuse normally received by the leading edges and surfaces thereof, and which can be easily removed and replaced with minimum effort and expense.

What is further needed is such a device available in kit form which is adaptable to existing emergency vehicle warning light systems having planar and arcuate leading surfaces.

SUMMARY OF THE INVENTION

An improved replaceable lens protector shield is provided for shielding the leading edges and surfaces of plastic lens of emergency vehicle warning light systems from the abusive environment normally encountered by such light systems.

The lens protector includes a flexible shield which is adapted to be positioned in overlying relation to a leading surface of the lens as an upper edge of the lens protector is spaced within a groove formed in the lens and a lower edge of the lens protector is spaced within another, opposing groove formed in the lens.

Ridges formed in the lens near each end of the shield provide latching means such that lateral movement of the shield relative to the lens is normally prevented. A notch at each end of the shield facilitates insertion of a prying instrument to assist with removal of the shield from the lens in preparation for installation of a replacement shield.

Similar notches along the lower edge of the shield may also be provided to facilitate removal of the shield.

Also, channels along the lower groove provide drainage for moisture contained in the lower groove.

A first modified embodiment of the replaceable lens protector includes a shield having upper and lower edges contained within opposing flexible tracks secured to the leading surface of an emergency vehicle warning light system. For a warning light system having adjacent leading surfaces, the first modified replaceable lens protector includes a duplex track adapted to receive one edge of each of the respective shields covering the leading surfaces.

A second modified embodiment of the replaceable lens protector includes a flexible heating element attached to a shield for thawing frost and ice thereon and for preventing rain and sleet from operably freezing thereto. The heating element is adapted to be powered by the electrical system powering the warning light system.

PRINCIPAL OBJECTS AND ADVANTAGES OF THE INVENTION

Thus, the principal objects and advantages of the present invention are: to provide a replaceable lens protector for a warning light system of an emergency vehicle; to provide such a lens protector which can be used on planar and arcuate surfaces; to provide such a lens protector which can withstand winds created during high speed travel of emergency vehicles and from hurricanes; to provide such a lens protector having a heating element for defrosting, de-icing and icing prevention purposes; to provide such a lens protector which can be quickly and easily replaced; to provide such a lens protector which is readily affixable to an existing emergency light system; to provide such a lens protector which can be molded into a lens for an emergency vehicle warning light system; and to generally provide such a lens protector which is economical to manufacture, easy to use, and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a replaceable lens protector according to the present invention.

FIG. 2 is an enlarged vertical cross-sectional view of the replaceable lens protector, taken generally along line 2—2 of FIG. 1.

FIG. 3 is an enlarged and fragmentary, horizontal cross-sectional view of the replaceable lens protector taken generally along line 3—3 of FIG. 1.

FIG. 4 is an enlarged and fragmentary, front elevational view of an end of the replaceable lens protector.

FIG. 5 is an enlarged and fragmentary, front elevational view of the replaceable lens protector.

DETAILED DESCRIPTION OF THE INVENTION

Figure 6:
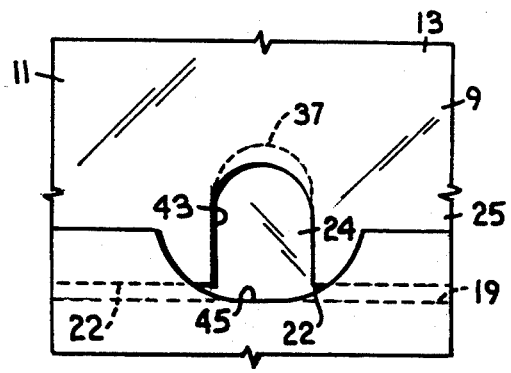
FIG. 6 is a further enlarged and fragmentary, front elevational view of a notch of the replaceable lens protector, according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a replaceable warning light lens protector in accordance with the present invention, as shown in FIGS. 1 through 6. The protector 1 generally includes shielding means 3, attaching means 5, and latching means 7.

The shielding means 3 generally include a shield 9 constructed of a thin sheet of flexible material, such as polycarbonate plastic as provided by General Electric Company under the trade name Lexan, or the like. Preferably, the shield 9 is sufficiently flexible such that the shield 9 can be manually conformed to operably assume the profile of a leading surface of a lens 11 of a warning light 13 of an emergency vehicle 15 as hereinafter described. The shield 9 has a selected thickness as appropriate for a particular application, such as a thickness in the range of approximately 0.005 to 0.5 mm. The particular material selected for construction of the shield 9 has properties whereby the shield 9 may be bent, if necessary, from a generally planar configuration to a generally arcuate configuration, as shown in FIG. 2, without generating a milky haze therein or otherwise reducing the transparency thereof as a result of such bending. Further, the material selected for the shield 9 provides suitable protection for the lens 11 from sunlight; from most airborne debris, such as sleet and hail, impacting bugs, small flying sand and gravel, hurricane-driven particulate matter, and the like; and other adverse elements normally incurred by the lens 11.

The attaching means 5 generally include an opposing pair of grooves 17 and 19 formed integrally in the lens 11. The spacing of the grooves 17 and 19 is such that, as the shield 9 is operably spaced in overlying relation with a leading surface 24 of the lens 11 as shown in FIG. 2, an upper edge 21 of the shield 9 is contained within the groove 17 as a lower edge 22 of the shield is contained within the groove 19.

The width of the grooves 17 and 19 is dimensioned to form snug, sliding engagements with the shield 9. The ledges 25 of the lens 11 are generally tapered, as shown in FIG. 2, such that wind noise arising from the ledges 25 is minimized as the emergency vehicle 15 is driven at high speeds.

The latching means 7 comprise portions of the lens 11 adjacent to the shield 9 formed into ridges 27, the extremities of which substantially align with an outer face 29 of the shield 9, as shown in FIG. 3. The ridges 27 are spaced apart such that opposing ends 31 of the shield 9 are spaced in close proximity to the ridges 27 as the upper and lower edges 21 and 22 of the shield 9 are retained within the grooves 17 and 19, as shown in FIGS. 3 and 4.

Alternatively, the ridges 27 may be eliminated such that the shield 9 can be slidably removed laterally from the grooves 17 and 19. Preferably, however, the shield 9 is displaced minimally laterally in order to avoid damage to the shield 9 and to a portion 33 of the lens 11 underlying the shield 9 from being scratched by debris, such as dust or the like disposed between the shield 9 and the lens portion 33.

The shield 9 may include removal means such as a notch 35 spaced generally medially at the shield ends 31, as shown in FIG. 4, to generally assist with removal of the respective shield 9 being replaced. If desired, the notch 35 may be tapered inwardly as indicated by the numeral 37 in FIG. 3, to receive a prying instrument (not shown) to assist with such removal of the shield 9.

If desired, additional notches 35 along either or both of the edges 21 and 22, such as that indicated by the numeral 43 in FIG. 3, may be used to assist with removal of the shield 9. One or more drains 45 may be provided along the groove 19 to provide drainage for moisture contained in the groove 19.

Figure 7:
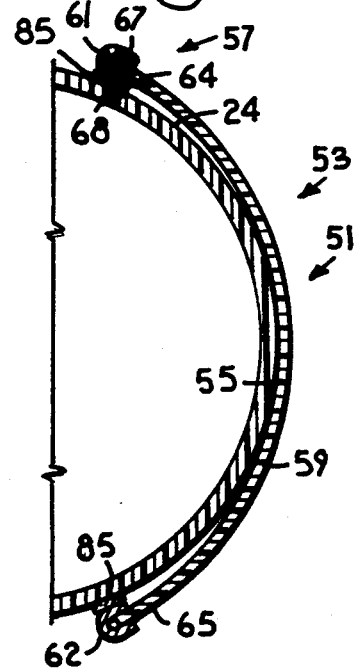
FIG. 7 is a vertical cross-sectional view of a first modified embodiment of a replaceable lens protector, showing the lens protector attached to a convex lens, according to the present invention.
Figure 8:
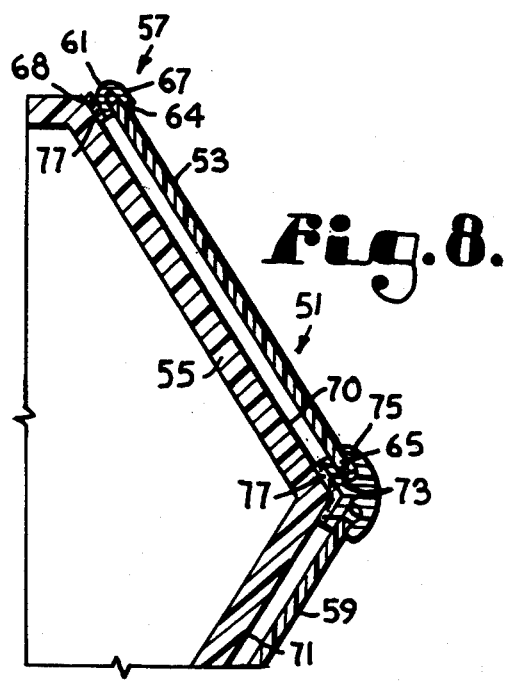
FIG. 8 is a vertical cross-sectional and fragmentary view of the first modified embodiment of the replaceable lens protector similar to that of FIG. 7, but showing the lens shield attached to a lens having a planar leading surface.

A first modified embodiment of a replaceable lens protector 51 in accordance with the present invention is shown in FIGS. 7 and 8. Many of the characteristics of the first modified lens protector 51 are substantially similar to those already described and will not be reiterated here.

The first modified replaceable lens protector 51 includes shielding means 53 for shielding a lens 55 of an emergency vehicle warning light (not shown) and attaching means 57. The shielding means 53 includes a shield 59. For one of the lens 55 having a generally arcuate configuration as shown in cross-section in FIG. 7, the shield 59 is constructed of flexible material such that the shield 59 can be manually conformed to the shape of the lens 55 as the shield 59 is installed thereon as hereinafter described.

For one of the lens 55 having a leading surface with a planar profile, such as that shown in FIG. 8, the shield 59 is preferably constructed of similar material as hereinbefore described, but having sufficient thickness or rigidity to provide rigid or semi-rigid characteristics. The spacing of the shield 59 from the lens 55, although minimal, provides additional cushioning to protect against flying debris, such as gravel, which might otherwise fracture or damage the underlying lens 55.

The attaching means 57 generally include an opposing pair of tracks 61 and 62 spaced apart to receive opposing upper and lower edges 64 and 65, respectively, of the shield 59. The tracks 61 and 62 are generally constructed of a resilient material, such as plastic, aluminum or other suitable material, such that opposing lips 67 and 68 of each of the tracks 61 and 62 can be spread apart to insert the respective upper edge 64 or lower edge 65 of the shield 59 and, upon release thereof, the lips 67 and 68 frictionally grasped the respective upper or lower edge 64 or 65 of the shield, such that the shield 59 is retained in overlying relation to the lens 55.

For those applications wherein the lens has two adjacent leading planar surfaces 70 and 71, as shown in FIG. 8, each one of the corresponding shields 59 is grasped along its upper and lower edges 64 and 65 by one of the tracks 61 and one of a pair of grooves 73 of a duplex track 75. The attaching means 57 generally include an adhesive 77, such as pressure sensitive double-back tape or other suitable means, such that the tracks 61 and 62 and the duplex track 75 are secured to the lens 55, as shown in FIG. 8.

The first modified embodiment of the replaceable lens protector 51 is adapted to be installed on the lens 55 of an existing emergency vehicle warning light system (not shown). For example, the tracks 61 and 62 may be appropriately spaced apart and adhesively secured to the lens 55. Then, the shield 59 is manually flexed to conform to the profile of the lens 55 as the upper and lower edges 64 and 65 are inserted into a respective one of the tracks 61 and 62. An instrument with a thin blade (not shown) may be used to assist with spreading the lips 67 and 68 of the tracks 61 and 62 to assist with such insertion of the edges 64 and 65 therein. For some applications, it may be advantageous to install a track similar, to that of the track 61, completely around a perimeter of the shield 59.

Figure 9:
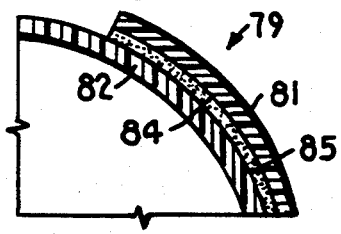
FIG. 9 is a vertical cross-sectional and fragmentary view of a second modified embodiment of a replaceable lens protector, according to the present invention.

A second modified replaceable lens protector 79 in accordance with the present invention is shown in FIG. 9. Many of the characteristics of the second modified replaceable lens protector 79 are substantially similar to those previously described for other embodiment herein and will not be reiterated here in detail.

The second modified lens protector 79 includes shielding means 81 for shielding a lens 82 of an emergency vehicle warning light (not shown) and attaching means 84. The shielding means 81 comprises a thin sheet of flexible material having characteristics as hereinbefore described. The attaching means 84 comprises a thin layer or sheet of pressure sensitive adhesive for securing the shielding means 81 directly to a leading surface 85 of the lens 82. Preferably, the attaching means 84 is easily removable without leaving any residue on the leading surface 85 other than residue which is also easily removable.

Figure 10:
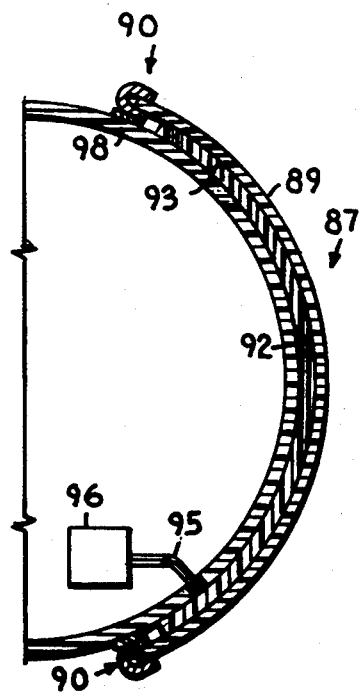
FIG. 10 is a vertical cross-section view of a third modified embodiment of a replaceable lens protector, showing a transparent heating element, according to the present invention.

A third modified replaceable lens protector 87 in accordance with the present invention is shown in FIG. 10. Many of the characteristics of the third modified replaceable lens protector 87 are substantially similar to those previously described for other embodiments herein and will not be reiterated here in detail.

The third modified replaceable lens protector 87 includes shielding means 89, attaching means 90, and heating means 92. The heating means 92 is preferably secured to an inside surface 93 of the shielding means 89 as shown in FIG. 10. Electrical conductors 95 for powering the heating means 92 are adapted to be connected to an electrical system 96, which is used to power the other elements of the emergency vehicle warning light system contained within a lens 98 thereof. Generally, the electrical system 96 includes control means whereby power to the heating means 92 is controllable remotely, such as from inside the respective emergency vehicle. The heating means 92 are adapted to provide sufficient thermal energy to thaw ice and the like from the shielding means 89 and to prevent ice, sleet and the like from operably building up on the shielding means 89, without damaging the shield means 89 or the lens 98.

It is foreseen that the heating means 92 can be utilized with any of the embodiments described herein.

It is also foreseen that the present invention can be utilized for headlights, signals and numerous other applications where protection of an exposed surface is desired.

It is to be understood that while certain forms of the present invention have been illustrated and described herein, it is not to be limited to the specific forms or arrangement of parts described and shown.

What is claimed and desired to be secured by Letters Patent is as follows:

1. A device for shielding a leading surface of a lens of a warning light system on the exterior of an emergency vehicle, said device comprising:
   (a) a shield constructed of a thin planar sheet of transparent material having upper and lower sides; said shield having sufficient flexibility to be conformable to the leading surface; and
   (b) attaching means for releasably attaching said shield to the leading surface of the lens such that said shield is conformed to the leading surface; said attaching means including at least one pair of opposing tracks adapted to grasp said upper and lower sides even as the emergency vehicle is driven at high speeds; said attaching means further including adhering means for adhering said tracks to the lens such that said shield generally covers only the leading surface of the lens.

2. The device according to claim 1, wherein:
   (a) said tracks are constructed of plastic.

3. The device according to claim 1, wherein:
   (a) said tracks are constructed of aluminum.

4. The device according to claim 1, wherein:
   (a) said shield is constructed of plastic.

5. The device according to claim 1, wherein:
   (a) said sheet has a thickness in the range of approximately 0.005 to 0.5 millimeters.

6. The device according to claim 1, wherein each of said at least one pair of opposing tracks has a pair of lips adapted to frictionally grasp a respective one of said upper and lower sides of said shield.

7. A device for a vehicle warning light system of an emergency vehicle, the light system having a lens with an arcuately convex leading surface, said device comprising:
   (a) a shield constructed of a thin planar sheet of transparent material having upper and lower sides; said shield having sufficient flexibility such that said shield can be manually flexed to conform to the leading surface without damaging said transparent material;
   (b) a pair of opposing tracks, each having a pair of opposing lips adapted to frictionally grasp a respective one of said upper and lower sides even as the emergency vehicle is driven at high speeds; and
   (c) adhering means for adhering said pair of tracks to the lens even as the emergency vehicle is driven at high speeds; and
   (d) wherein said shield is dimensioned and said pair of opposing tracks are spaced such that said shield generally covers only the leading surface of the lens and said shield is conformed to the shape of the leading surface as said upper and lower sides are retained in a respective one of said pair of opposing tracks, and wherein said shield is easily removable from said pair of opposing tracks by flexing said shield.

8. A replaceable lens protector for installation on an existing vehicle warning light system of an emergency vehicle wherein the system has a lens with a convexly arcuate leading surface, comprising:

(a) a planar, flexible, transparent sheet of shield material having upper and lower sides;

(b) a pair of tracks, each having a pair of lips adapted to frictionally grasp a respective one of said upper and lower sides; and (c) adhering means for adhering said pair of tracks to the leading surface of the lens such that said shield material generally covers, and conforms to, the leading surface as said upper and lower sides are retained in a respective one of said pair of tracks even as said protector is subjected to wind created during high speed travel of the emergency vehicle.

* * * * *